United States Patent
Tremolieres et al.

(10) Patent No.: US 11,525,583 B2
(45) Date of Patent: Dec. 13, 2022

(54) TELESCOPIC RAIL

(71) Applicant: Accuride International GmbH, Diez (DE)

(72) Inventors: Laurent Tremolieres, Limburg-Linter (DE); Andreas Heffel, Bendorf (DE)

(73) Assignee: ACCURIDE INTERNATIONAL GMBH, Diez (DE)

(*) Notice: Subject to any disclaimer, the term of this patent is extended or adjusted under 35 U.S.C. 154(b) by 737 days.

(21) Appl. No.: 16/480,461

(22) PCT Filed: Apr. 9, 2018

(86) PCT No.: PCT/EP2018/059012
§ 371 (c)(1),
(2) Date: Jul. 24, 2019

(87) PCT Pub. No.: WO2018/189098
PCT Pub. Date: Oct. 18, 2018

(65) Prior Publication Data
US 2019/0383498 A1 Dec. 19, 2019

(30) Foreign Application Priority Data
Apr. 12, 2017 (DE) .......................... 102017107954.8

(51) Int. Cl.
*F24C 15/16* (2006.01)
*A47B 88/40* (2017.01)
(Continued)

(52) U.S. Cl.
CPC ............ *F24C 15/168* (2013.01); *A47B 88/40* (2017.01); *F16C 29/005* (2013.01);
(Continued)

(58) Field of Classification Search
CPC ................... F24C 15/168; A47B 88/40; A47B 2210/0035; A47B 2210/17; F16C 29/005; F16C 29/046; F16C 29/048; F16C 33/38
See application file for complete search history.

(56) References Cited

U.S. PATENT DOCUMENTS 2,400,374 A * 5/1946 Selnes ..................... F16C 33/32
                                                        384/49
3,764,188 A * 10/1973 Suska ................. F16C 33/6696
                                                        384/463
(Continued)

FOREIGN PATENT DOCUMENTS

CH           314736         6/1956
DE      102005028673 A1    12/2006
(Continued)

*Primary Examiner* — Hanh V Tran
(74) *Attorney, Agent, or Firm* — Snell & Wilmer L.L.P.; Kent A. Lembke

(57) ABSTRACT

The present application concerns a telescopic rail comprising a first rail element, at least one further rail element and at least one rolling body cage for positioning a plurality of rolling bodies between two rail elements, wherein the rolling body cage has at least two receiving limbs having a respective plurality of through openings, wherein the receiving limbs together have a cross-section partially enclosing an internal space, and a plurality of rolling bodies received in the through openings in the receiving limbs, wherein the rolling body cage is arranged with the rolling bodies between the first rail element and the further rail element. According to the invention it is proposed that such a telescopic rail be modified to such an effect that the telescopic rail has a first group of rolling bodies and the rolling bodies of the first group are made of graphite, wherein the telescopic rail has a second group of rolling bodies and the rolling bodies of the second group are made of a material which is of greater hardness than the graphite of the rolling (Continued)

Figure 1:
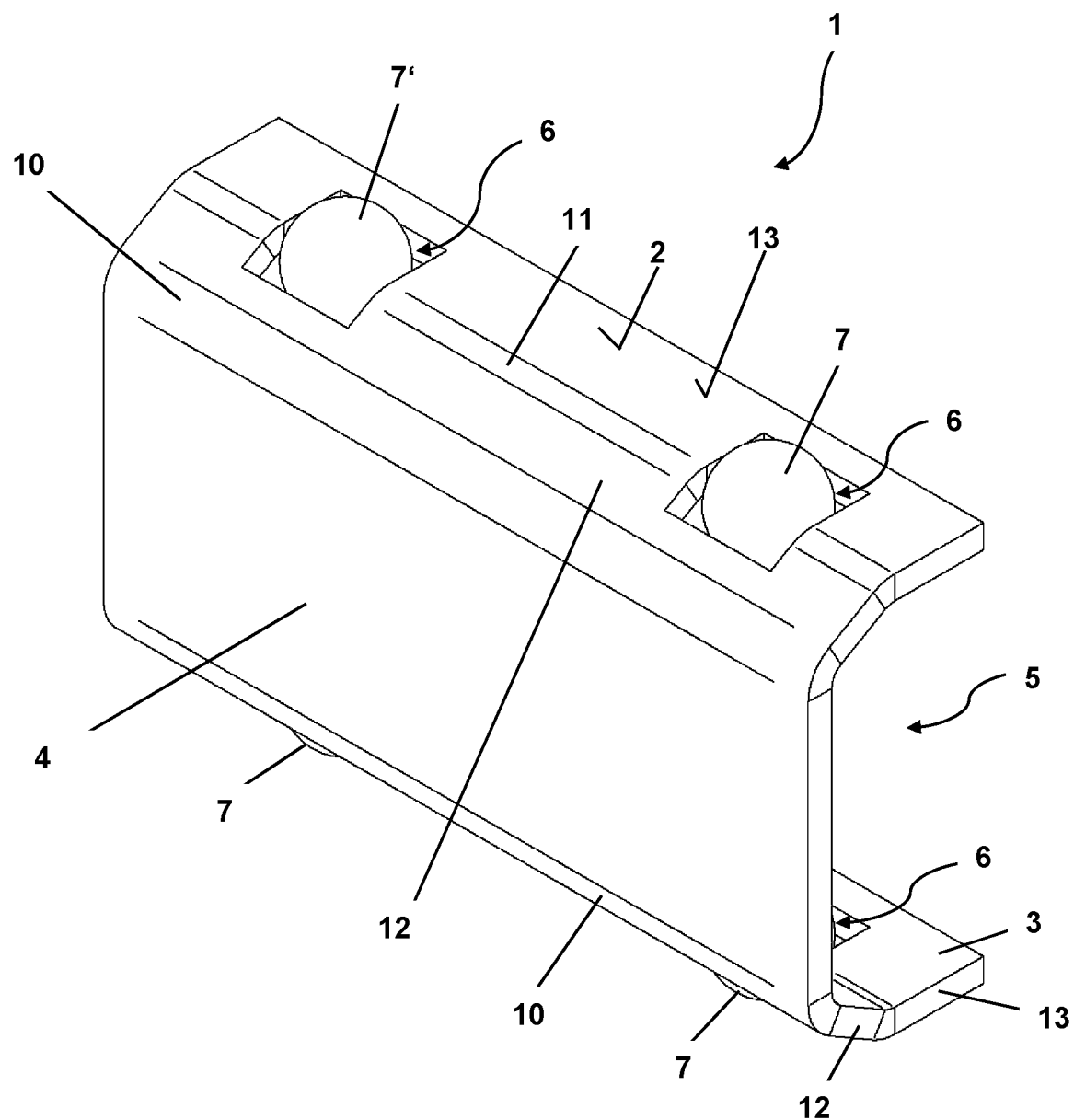

bodies of the first group, and wherein at least two rolling bodies of the second group are respectively received in the through openings of at least two receiving limbs.

14 Claims, 5 Drawing Sheets

(51) Int. Cl.
    *F16C 29/00*     (2006.01)
    *F16C 29/04*     (2006.01)
    *F16C 33/38*     (2006.01)

(52) U.S. Cl.
    CPC .......... *F16C 29/046* (2013.01); *F16C 29/048* (2013.01); *F16C 33/38* (2013.01); *A47B 2210/0035* (2013.01); *A47B 2210/17* (2013.01)

(56) References Cited

U.S. PATENT DOCUMENTS

| | | | |
|---|---|---|---|
| 4,991,981 A | 2/1991 | Baxter | |
| 5,417,496 A * | 5/1995 | Hobbs | A47B 88/493 384/49 |
| 5,737,971 A * | 4/1998 | Riefe | F16C 33/32 384/49 |
| 9,192,232 B2 * | 11/2015 | Park | A47B 88/477 |
| 9,357,843 B2 * | 6/2016 | Jährling | F16C 29/005 |
| 2004/0223670 A1 * | 11/2004 | Ramonat | F16C 33/3825 384/45 |
| 2008/0258592 A1 * | 10/2008 | Blum | A47B 88/493 312/334.1 |
| 2013/0193824 A1 * | 8/2013 | Koenig | A47B 88/437 312/334.11 |

FOREIGN PATENT DOCUMENTS

| | | | | |
|---|---|---|---|---|
| DE | 202008004658 U1 * | 9/2009 | ........... | F24C 15/168 |
| DE | 202011051895 U1 | 1/2012 | | |
| EP | 2481990 A1 | 8/2012 | | |
| EP | 2992782 A1 * | 3/2016 | ........... | A47B 88/487 |
| WO | WO-2008067795 A2 * | 6/2008 | ............. | F16C 33/32 |
| WO | 2008119322 A1 | 10/2008 | | |
| WO | 2009012757 A2 | 1/2009 | | |
| WO | 2012045854 A1 | 4/2012 | | |

* cited by examiner

TELESCOPIC RAIL

The present application concerns a telescopic rail comprising a first rail element, at least one further rail element and at least one rolling body cage for positioning a plurality of rolling bodies between two rail elements, wherein the rolling body cage has at least two receiving limbs having a respective plurality of through openings, wherein the receiving limbs together have a cross-section partially enclosing an internal space, a plurality of rolling bodies received in the through openings in the receiving limbs, wherein the rolling body cage is arranged with the rolling bodies between the first rail element and the further rail element.

The present application also concerns an item of equipment or an apparatus, in particular a domestic appliance, having such a telescopic rail.

Telescopic rails having a first rail element, at least one further rail element and at least one rolling body cage, in particular a ball cage, with rolling bodies accommodated therein, in particular balls, between the first rail element and the further rail element, are known from the state of the art. They are used inter alia in different domestic appliances, for example in dishwashers, microwaves, ovens, steam cooking appliances and so forth. Such telescopic rails in those appliances are used for holding and pulling out sliding inserts, for example steam cooking material support trays, including baking pans and grills.

To permit the telescopic rails to be pulled out of and pushed into a domestic appliance with the lowest possible level of friction rolling bodies are arranged between two respective rail elements in many embodiments of telescopic rails known in the state of the art, wherein the rolling bodies upon a relative movement of the rail elements with respect to each other roll the surfaces of the rail elements. The rolling friction which occurs in that case is less than direct sliding friction between the rail elements without rolling bodies. In order to ensure uniform distribution of the rolling bodies between two rail elements which are moveable relative to each other the rolling bodies are typically guided in so-called rolling body cages. In that arrangement a rolling body cage guarantees a defined spacing between the rolling bodies in the extension direction.

In order to achieve uniform movement at a low noise level upon relative displacement of the rail elements with respect to each other the telescopic rails known from the state of the art require lubrication. Such lubrication is achieved for example greasing the bearing formed by the rail elements and the rolling bodies. Particularly in use in domestic appliances such grease-like lubrication however suffers from disadvantages. On the one hand food-compatible lubricants are typically not suitable for use at high temperatures. Accordingly telescopic rails lubricated in that way have to be removed for example prior to pyrolysis of an oven. In addition the rails which are lubricated in that way are also not dishwasher-suitable as dishwasher water washes the lubricant out of the bearing region so that the lubrication effect deteriorates at least after a few dishwashing operations.

Solid lubricants are therefore known from the state of the art, in which the lubricant is introduced into the bearing by frictional engagement between a rolling body and a porous body loaded with a lubricant. That lubrication deteriorates after a certain number of actuating cycles as the lubricant supply in the porous body is used up.

In comparison an object of the present invention is to provide a telescopic rail which affords durable lubrication. In addition an object of the present invention is to provide a telescopic rail, the lubrication of which is also suitable for use at high temperatures, for example in a baking oven or in a microwave oven. A further object of the invention is to provide a telescopic rail which is suitable for use at low temperatures. A further object of the invention is to provide a telescopic rail which is dishwasher-safe and nonetheless provides the necessary lubrication At least one of the above-indicated objects is attained by a telescopic rail of the kind set forth in the opening part of the specification, wherein the telescopic rail has a first group of rolling bodies and the rolling bodies of the first group are made of graphite, wherein the telescopic rail has a second group of rolling bodies and the rolling bodies of the second group are made of a material which is of greater hardness than the graphite of the rolling bodies of the first group, and wherein at least two rolling bodies of the second group are respectively received in the through openings of at least two receiving limbs.

It has surprisingly been found that it is possible to produce rolling bodies from graphite, which run guided by the rolling body cage between two rail elements entirely similarly to rolling bodies of hard materials like steel, and in that situation experience a certain material removal effect which as graphite lubrication lubricates the movement of the harder rolling bodies between the rail elements.

The lubrication afforded in that way is found to be very long-lasting as the rolling bodies are made completely from graphite and removal of the graphite material occurs only in comparatively small amounts. In addition graphite is found to be temperature-resistant even in temperature ranges above 300° C., at which grease-like lubricants are no longer suitable, in particular for domestic appliances for processing foodstuffs. At low temperatures also, that is to say at temperatures at which lubricants containing grease or oil are of markedly reduced viscosity or even freeze, graphite substantially retains its lubricating action. In addition graphite is found to be substantially emission-free even at higher temperatures so that it is suitable both for appliances for preparing or processing foodstuffs and also for vacuum applications.

Graphite moreover is resistant to usual, in particular domestically usual, cleaning agents, including those as are used in dishwashers. Therefore the lubricating function of the rolling bodies of graphite does not deteriorate even after a rinsing operation, but in particular also after rinsing in a dishwasher. Admittedly rinsing means that a part of the graphite which was transferred on to the rail elements or the harder rolling bodies is washed off. However after a one-off displacement of the rail elements relative to each other the removal of material from the graphite rolling bodies is already sufficient to provide a fresh lubrication for the telescopic rail again.

When in accordance with the present application reference is made to a telescopic rail that term is to be interpreted generally such that it embraces not only rails thereof, in which the first rail element and at least one further rail element are of approximately the same length, but also linear guide arrangements in which a further rail element is markedly shorter than the first rail element.

The term rolling body in accordance with the present application is used to denote a rotational body which as an element of a guide means considerably reduces the friction between the various rail elements and thus facilitates relative movement of two rails with respect to each other. Rolling bodies are for example balls, rollers, barrels, needles or cones.

In an embodiment of the present invention both the rolling bodies of the first group and also the rolling bodies of the second group are balls. It will be appreciated that in that case the rolling body cage is a ball cage.

The rolling bodies are accommodated in the rolling body cage in the through openings in the receiving limbs.

The rolling body cage includes at least two receiving limbs having through openings for the rolling bodies. In particular the rolling body cage in embodiments thereof can have precisely two, precisely three or precisely four receiving limbs with through openings for the rolling bodies.

In an embodiment the rolling body cage has at least one connecting portion connecting two receiving limbs. In an embodiment that substantially determines the width of the rolling body cage. In an embodiment a connecting portion is provided between two respective receiving limbs of the rolling body cage.

In an embodiment precisely two receiving limbs having the through openings for receiving the rolling bodies extend from a connecting portion substantially perpendicularly thereto and in mutually parallel relationship. The receiving limbs and the connecting portion together form a substantially C-shaped profile in this embodiment.

In an embodiment of the invention the rolling body cage is made from a material selected from a group consisting of aluminised steel sheet, high-grade steel or plastic.

It is firstly crucial for the present invention that the rolling bodies of the second group are made from a material which is of greater hardness, in particular a greater Shore hardness, than the graphite of the rolling bodies of the first group. Therefore the rolling bodies of the second group are produced in particular from steel or plastic.

Graphite as a material is rather brittle and can withstand compression loadings only to a certain degree. In accordance with the invention therefore at least two rolling bodies of the second group of rolling bodies are received in the through openings in each receiving limb. They serve to carry the loads from the first rail element to the further rail element while the rolling bodies of the first group substantially only perform a lubricating function.

In an embodiment of the invention the rolling bodies of the first group and the rolling bodies of the second group in at least one section plane are of a circular cross-section of a diameter, wherein in the through openings of each of at least two receiving limbs of the rolling body cage all rolling bodies of the first group are of a smaller diameter than at least two rolling bodies of the second group. It is possible in that way for the rolling bodies of graphite of the first group to be kept substantially load-free during relative displacement of the rail system elements with respect to each other.

In an embodiment of the invention all rolling bodies of the first group are of a smaller diameter than the rolling bodies of the second group. In particular however in an embodiment all rolling bodies of the first group that are accommodated in a receiving limb are of a smaller diameter than two rolling bodies of the second group at the same receiving limb.

It is however also possible that in an embodiment all rolling bodies of the first group and the second group in a receiving limb are of the same diameter.

The use of rolling bodies made from graphite in a telescopic rail requires a careful choice of the material from which those rolling bodies are made. In an embodiment of the invention therefore the graphite of the first group of rolling bodies is of a hardness of 50 Shore or more, preferably 60 Shore or more.

In an embodiment of the invention the rolling bodies of the first group comprise graphite.

In an embodiment the graphite of the first group of rolling bodies has a compression strength of 90 MPa or more, preferably 100 MPa or more.

In an embodiment of the invention the graphite of the rolling bodies of the first group is synthetically produced fine-grain graphite. In an embodiment that synthetic fine-grain graphite is free of binding agents. In particular the rolling bodies of the first group in an embodiment of the invention contain more than 95% graphite. In a further embodiment of the invention the rolling bodies of the first group have 99% or more, preferably 99.9% or more of graphite with a residue of inevitable impurities like for example ash.

In an embodiment the graphite is isostatically pressed fine-grain graphite.

In an embodiment for producing the rolling bodies of the first group graphite as the raw material is crushed and mixed in mixing assemblies with carbon-bearing binding agents like for example pitches. That is then followed by shaping of the rolling bodies. Different methods are available for that purpose: isostatic pressing, extrusion, vibration compacting and die pressing. The pressed "green" shaped bodies of the rolling bodies are then fired with the exclusion of oxygen and graphitised. That is possibly also followed by mechanical machining of the graphitised shaped bodies to acquire the nominal dimension of the rolling bodies of the first group.

In an embodiment of the invention the rolling bodies of the first group are arranged in different through openings in the receiving limbs from the rolling bodies of the second group. Astonishingly, separation of the rolling bodies of the two groups provides more effective lubrication than arrangement in the same through openings although in the case of the latter arrangement the rolling bodies are in engagement with each other.

In an embodiment of the invention each rolling body of the first group is respectively separated from the rolling bodies of the second group by a portion of a receiving limb of the rolling body cage.

In an embodiment of the invention rolling bodies of the first group and rolling bodies of the second group are arranged in each receiving limb alternately in the longitudinal direction. That provides for highly effective lubrication, wherein the telescopic rail at the same time permits a high load transfer effect.

In an embodiment of the invention the first and the last rolling bodies viewed in the longitudinal direction in each receiving limb are respectively rolling bodies of the second group.

In a further embodiment the number of rolling bodies of the second group in each of the receiving limbs is at least twice as great as the number of rolling bodies of the first group.

In still a further embodiment of the invention all through openings in the receiving limbs, irrespective of whether they receive a rolling body of the first group or a rolling body of the second group, are of the same geometrical shape. In an embodiment of the invention in that respect all through openings in the receiving limbs are of the same area. Such a rolling body cage can be very inexpensively produced.

In an embodiment at least one of the through openings of each receiving limb is of a cross-section which narrows in the direction of the internal space in at least a section plane perpendicular to the receiving limbs and to the connecting portion.

Such a geometry of the through openings attains the object of the invention with a suitable choice of the balls. The rolling bodies are prevented by the through openings themselves from dropping in to the internal space defined by the C-shaped profile.

When in accordance with the present invention the cross-section of the receiving limbs and the connecting portion is together referred to as being C-shaped that describes the basic shape of the rolling body cage.

Alternatively the section plane which is perpendicular to the receiving limbs and to the connecting portion can also be described as the section plane perpendicular to the longitudinal extent of the ball cage or as the section plane perpendicular to the direction of extension of a telescopic rail with the rolling body cage according to the invention.

The rolling body cage of such a configuration however not only has the advantage that in the assembly procedure the rolling bodies cannot fall into the internal space formed by the C-shaped rolling body cage, but the geometry of the through openings also prevents the rolling body cage from striking against the rail elements in the assembled state. Rather, the rolling body cage comes into engagement exclusively with the rolling bodies and not with the rails. That reduces a rattling which otherwise can be perceived as a nuisance noise and which is caused by the rolling body cage hitting against the rails. That rattling is noticeable not only acoustically but also in the form of vibration when handling the rails.

In that respect it is to start with immaterial at what position of a through opening in the longitudinal direction of the rolling body cage (this coincides with the direction of extension of the assembled telescopic rail), the narrowing cross-section is provided.

Embodiments are conceivable in which a through opening in each section plane perpendicular to the receiving limbs and to the connecting portion is of a cross-section narrowing in the direction of the internal space. As an example of that mention may be made of a circular conical through opening. It will be appreciated that in such an embodiment the minimum spacing of the narrowing cross-section changes in the longitudinal direction of the rolling body cage over the through opening.

In an alternative embodiment in which the through opening is substantially square the narrowing cross-section profile in all section planes perpendicular to the receiving limbs and perpendicular to the connecting portion can be constant.

In an embodiment of the invention the oppositely disposed side surfaces of the through opening in a section plane perpendicular to the receiving limbs and to the connecting portion are straight. Such a geometry can be produced with a low level of complication and expenditure.

In that respect in accordance with the present invention those surfaces of the through opening which are referred to as the side surfaces are those which connect the top side and the underside of the material portion together after production of the through opening. With a cylindrical through opening in the form of a bore or stamped-out hole for example the side surface of the through opening is the cylindrical peripheral surface of the hole.

One possibility is for the through openings to be produced with side surfaces which converge towards each other in the direction of the internal space, in a portion of a receiving limb, that is flat when considered in itself. That can be effected for example with cutting methods.

In an alternative embodiment of the invention the through openings have straight mutually oppositely disposed side surfaces in at least one section plane that is perpendicular to the receiving limbs and to the connecting portion, wherein each of the receiving limbs has portions which are angled relative to each other about an axis perpendicular to the section plane, wherein the axis intersects the through openings so that the side surfaces are at a spacing from each other, that decreases in the direction of the internal space.

In such a configuration the cross-section of the through openings, that narrows in the direction of the internal space, is afforded by folding over of the receiving limbs about an axis extending in the longitudinal direction, that is to say in a direction perpendicular to the section plane.

That has a considerable advantage from the point of view of production procedure as the through openings can firstly be introduced into a flat portion of material with mutually parallel side surfaces or a cylindrical side surface, in which case the narrowing geometry is only subsequently produced by folding over the receiving limbs.

At least one of the above-mentioned objects is also attained by a domestic appliance for foodstuff preparation, in particular an oven, a steam cooker and a combination steamer, having a telescopic rail as was described hereinbefore in embodiments of the present invention.

This applies in particular to domestic appliances which permit self-cleaning with pyrolysis.

In addition at least one of the above-mentioned objects is also attained by a dishwasher having a telescopic rail in an embodiment of the present invention as were described hereinbefore.

Furthermore at least one of the above-mentioned objects is also attained by a climatic chamber having a telescopic rail in an embodiment of the present invention as were described hereinbefore.

Further advantages, features and possible uses of the present invention are clearly apparent from the description hereinafter of embodiments and the accompanying Figures.

Figure 2:
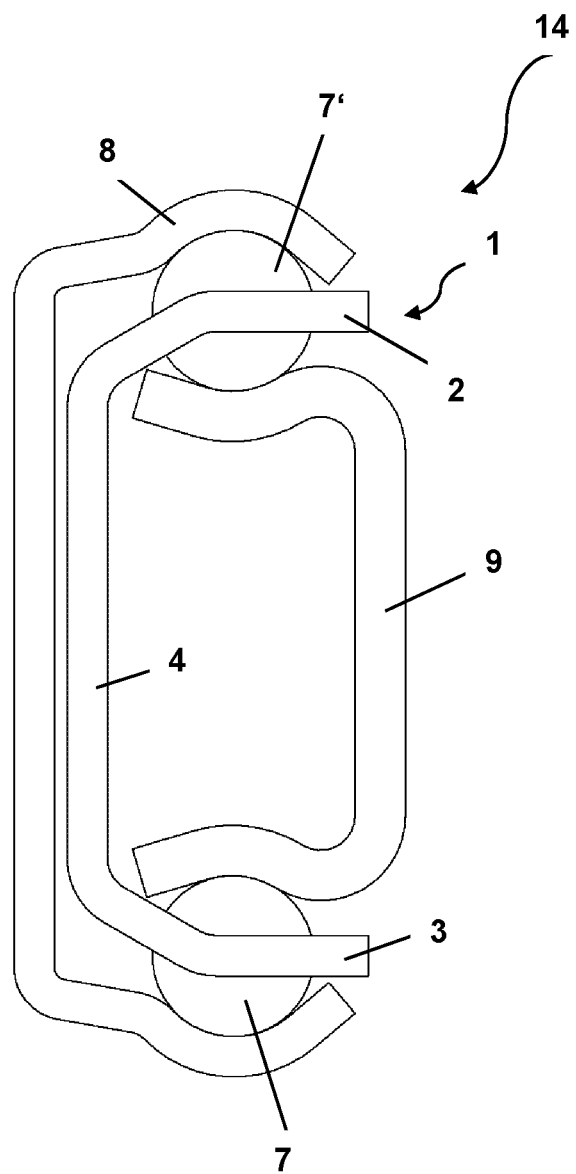
Figure 3:
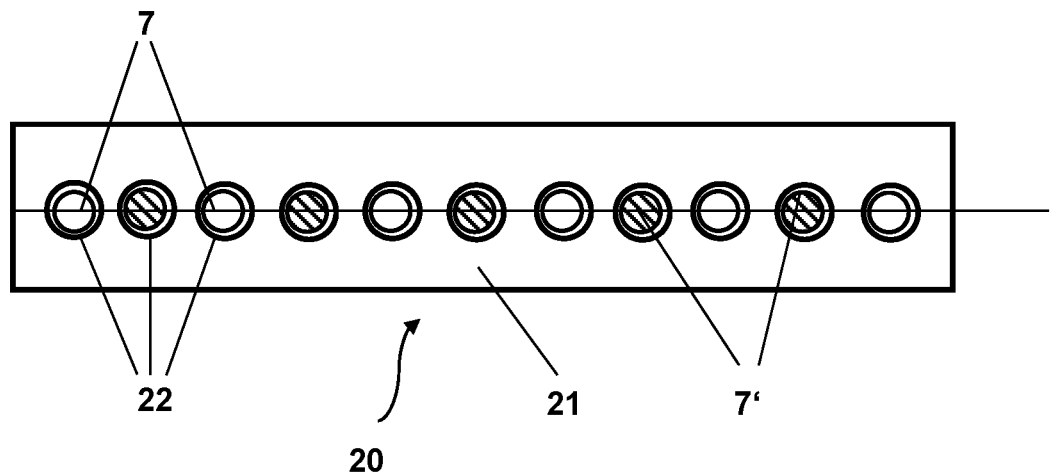
Figure 4:
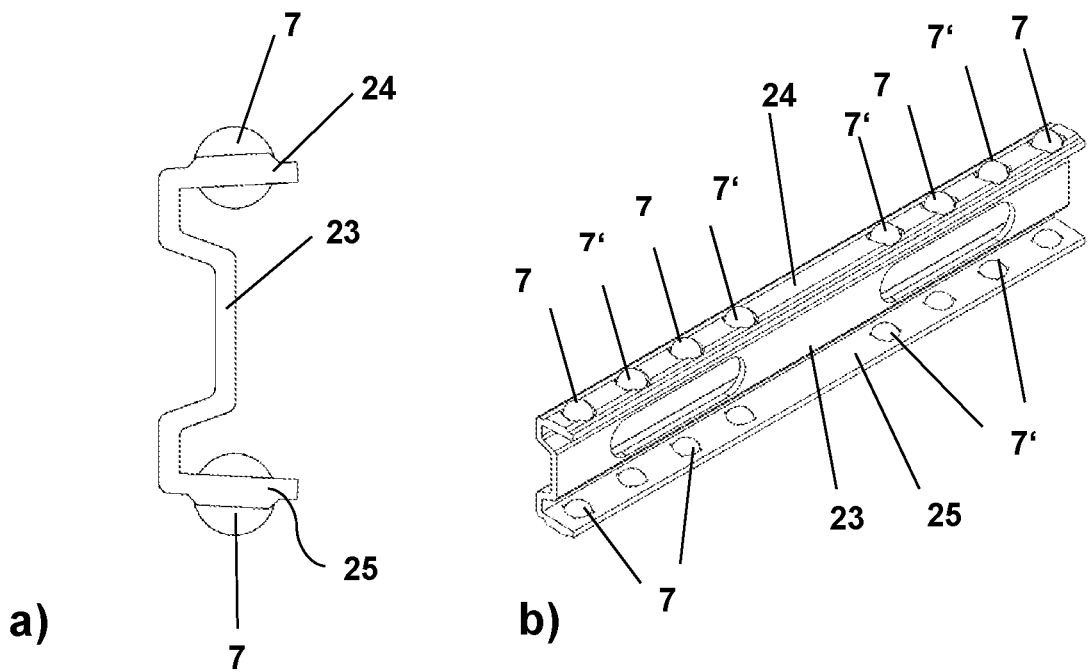

FIG. 1 shows a perspective view inclinedly from above of a ball cage with balls received therein for a telescopic rail according to a first embodiment of the present invention, FIG. 2 shows a broken-away diagrammatic side view of a telescopic rail according to the invention with the ball cage of FIG. 1, and FIG. 3 shows a diagrammatic plan view of a further embodiment of a ball cage with balls received therein for a telescopic rail according to the invention.

In the Figures identical components are denoted by the same references.

The basic function of the telescopic rails according to the invention as shown in the Figures or rolling body cages for such a telescopic rail is that both rolling bodies 7 of steel and also rolling bodies 7' of graphite are received in the rolling body cages. In that case the rolling bodies 7 of steel, here bearing balls, belong to the second group of rolling bodies in accordance with the present application. The rolling bodies 7', here balls, of graphite, belong to the first group of rolling bodies in accordance with the present application. While the balls 7 of steel serve to carry loads the balls 7' of graphite provide for lubrication of the bearing formed by the rail elements 8, 9 and the balls 7, 7'. For that purpose all balls 7' of graphite are of the same diameter and all balls 7 of steel are of the same diameter, the diameter of the steel balls 7 being greater than the diameter of the balls 7' of graphite.

In all illustrated embodiments the balls of graphite are produced from isostatically pressed fine-grain graphite. That material is foodstuff-compatible and also dimensionally stable at temperatures above 300° C.

FIG. 1 shows a first embodiment of a rolling body cage, here a ball cage 1, for a telescopic rail according to the present invention, which performs the above-mentioned function. The ball cage 1 has two receiving limbs 2, 3 and a connecting portion 4. In this arrangement the connecting portion 4 extends between the two receiving limbs 2, 3 which are substantially perpendicular to the connecting portion 4, and connect the limbs. The receiving limbs 2, 3 and the connecting portion 4 together form a substantially C-shaped cross-section. That C-shaped cross-section can be particularly clearly seen from FIG. 1. With that cross-section, the receiving limbs 2, 3 and the connecting portion 4 partially enclose an internal space or partially embrace it.

As can be clearly seen from FIG. 1 at least for the first receiving limb 2 each receiving limb 2, 3 has a plurality of through openings 6. In the illustrated embodiment each of the receiving limbs 2, 3 has two identical through openings 6.

In the illustrated embodiment of the ball cage the through openings 6 are substantially square and are completely enclosed by the material of the receiving limbs 2, 3. In other words these are through holes of square cross-section in the receiving limbs 2, 3. The balls 7, 7' are received in the through openings 6. In this arrangement the ball 7 is a steel ball and the ball 7' is a graphite ball.

The spacing of the two through openings 6 in each of the receiving limbs 2, 3 defines the ball spacing in the installed state of the ball cage.

In the illustrated embodiment the ball cage 1 is made from an aluminised steel sheet. For that purpose firstly the material for the ball cage is stamped out of a steel plate or a strip steel and then the required through openings are also introduced into the sheet material by stamping. In the flat sheet portion produced in that way, all through openings, in particular the openings for receiving the steel balls and the graphite balls, have side surfaces which are straight and perpendicular to the surface of the sheet material. In the illustrated embodiment the sheet material of the ball cage is 1 mm in thickness. The steel sheet of the ball cage is of a substantially constant thickness or gauge of material over its entire extent.

For the square through openings of the ball cage in FIG. 1 this means that two mutually opposite side surfaces are respectively parallel to each other and mutually abutting side surfaces include a right angle to each other. When a ball is fitted into such a through opening then in dependence on a difference between its diameter and the side lengths of the square, the ball either rests upwardly on the sheet or it falls through same.

The C-shaped basic form is now produced by folding over the receiving limbs 2, 3 with respect to the connecting portion 4 about a bend line 10 parallel to the longitudinal extent of the ball cage 1. Each of the receiving limbs 2, 3 is then bent once more. This time about a bend line or axis 11 parallel to the first bend line 10. That axis 11 intersects the through openings 6 and provides that each receiving limb is now composed of two portions 12, 13 which are angled relative to each other.

Figure 5:
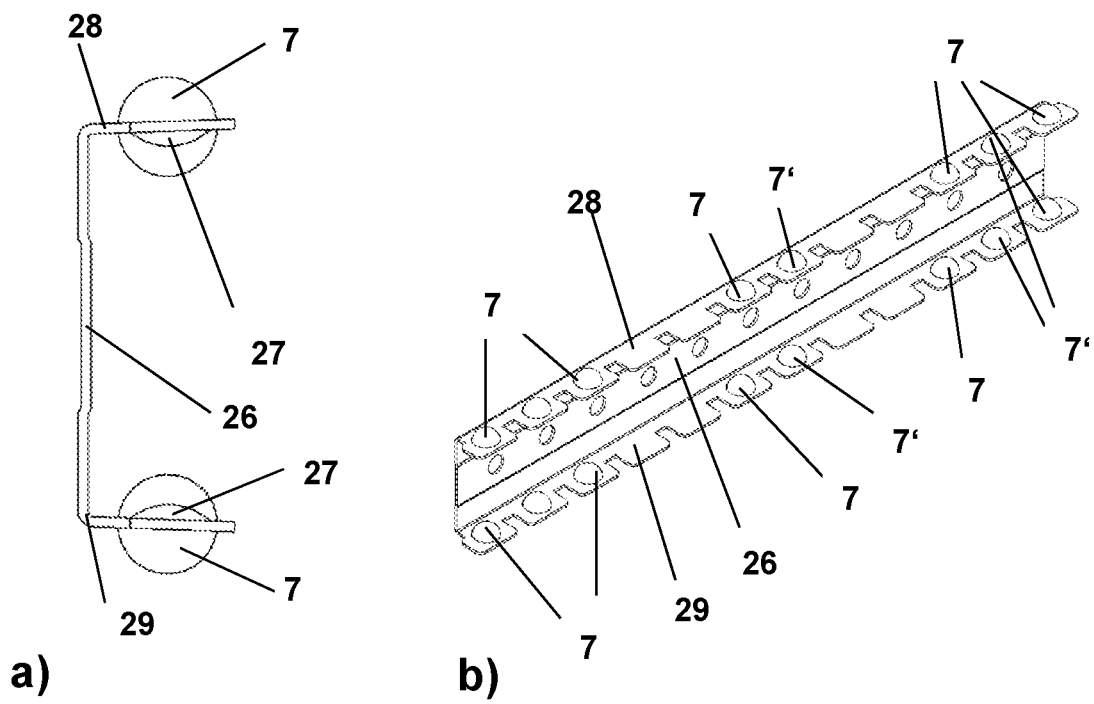

After the bending operation the side surfaces include an angle with each other so that the cross-section of the through opening 6 narrows in the direction of the internal space 5 in the section plane. If the smallest spacing between the two side surfaces measured parallel to the section plane is smaller than the diameter of the balls 7, 7' then it is prevented from falling through in the direction of the internal space 5 by the side surfaces as shown in FIG. 5. In other words the side walls conically converge.

FIG. 2 shows the ball cage 1 in the installed state, that is to say extending between two rail elements 8, 9 of a telescopic rail 14 according to the invention. The arrangement of the ball cage 1 between the outer rail 8 and the inner rail 9 of the telescopic rail 14 can be seen from the diagrammatic side view of the rail 14 in FIG. 2. FIG. 3 shows a view from above of a further embodiment of a ball cage 20 with bearing balls received therein. In the illustrated embodiment the ball cage 20 has circular through openings 22 in which the balls are fitted in both receiving limbs, of these only the first receiving limb 21 is shown in FIG. 3. It will be apparent from the plan view of FIG. 3 that balls 7 of steel and balls 7' of graphite are arranged alternately in the through openings 22. In that respect it is decisive that in this embodiment the ball 7 which is first in the longitudinal direction and the ball 7 which is last in the longitudinal direction are steel balls.

FIGS. 4 to 7 show alternative configurations of ball cages for telescopic rails according to the invention. The numerous variants show that the specific shape or the profile of the ball cage and the rail elements are immaterial in terms of the principle of the present invention and the only important consideration is that both balls of steel and also balls of graphite are received in the receiving limbs of the ball cages.

FIG. 4a) shows a ball cage 21 which is also to be described as substantially C-shaped. As previously it has two receiving limbs 24, 25, but with through openings of a shallow dome-shaped configuration for the balls 7 of steel and the balls 7' of graphite. For better understanding FIG. 4b) shows a perspective view inclinedly from above of the ball cage 23 of FIG. 4a).

The ball cage 26 in FIGS. 5a) and b) is a simple embodiment of bent steel plate in which the domes 27 for receiving the balls 7, 7' are produced by pressing in the sheet metal portions which form the receiving limbs 28, 29 of the ball cage 26 around the through openings.

Figure 6:
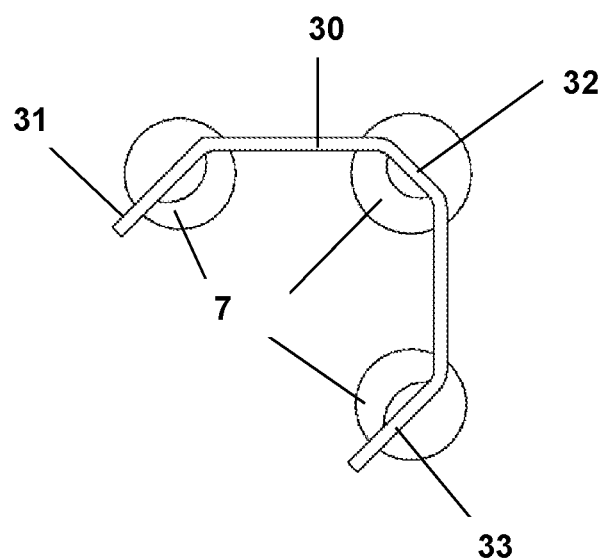
Figure 7:
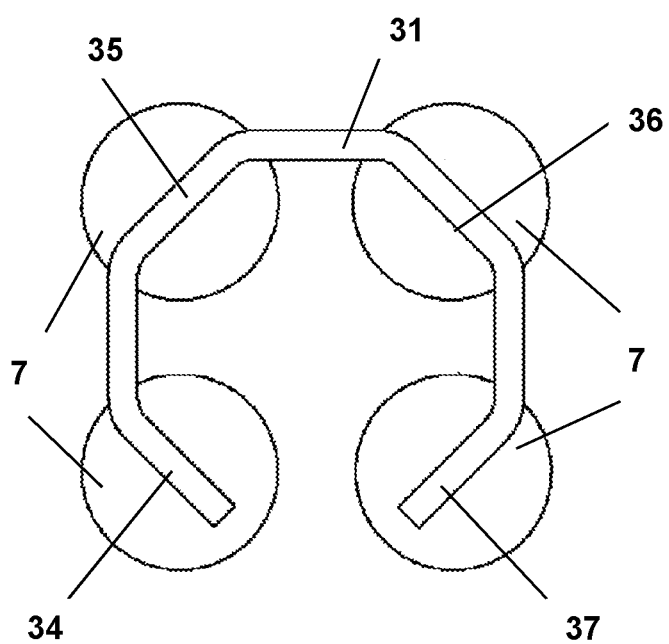

While FIGS. 1 to 5 respectively show ball cages with precisely two receiving limbs and a connection portion disposed therebetween FIGS. 6 and 7 show ball cages 30, 31 with three receiving limbs (FIG. 6) and four receiving limbs (FIG. 7) respectively, each with a connecting portion arranged therebetween. In the illustrated embodiments both balls 7 of steel and also balls 7' of graphite are received at each of the receiving limbs 31, 32, 33, 34, 35, 36, 37. However embodiments are also conceivable, in which exclusively balls of graphite or exclusively balls of steel are received at least in one of the receiving limbs.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

While the invention has been illustrated and described in detail in the drawings and the preceding description that illustration and description is only by way of example and is not deemed to be a limitation on the scope of protection as defined by the claims. The invention is not limited to the disclosed embodiments.

Modifications in the disclosed embodiments are apparent to the man skilled in the art from the drawings, the description and the accompanying claims. In the claims the word 'have' does not exclude other elements or steps and the indefinite article 'a' does not exclude a plurality. The mere fact that certain features are claimed in different claims does not exclude the combination thereof. References in the claims are not deemed to be a limitation on the scope of protection.

LIST OF REFERENCES 1 ball cage
2 receiving limb
3 receiving limb
4 connecting portion
5 internal space
6 through opening
7 ball of steel
7' ball of graphite
8 outer rail
9 inner rail
10 bend line
11 axis
12 first angled portion of the receiving limb
13 second angled portion of the receiving limb
14 telescopic rail
20 ball cage
21 receiving limb
22 circular through opening
23 ball cage
24, 25 receiving limb
26 ball cage
27 shallow dome
28, 29 receiving limb
30, 31 ball cages
31-37 receiving limb

The invention claimed is:

1. A telescopic rail comprising
a first rail element,
at least one further rail element and
at least one rolling body cage for positioning a plurality of rolling bodies between the first rail element and the further rail element, wherein the rolling body cage has at least two receiving limbs having a respective plurality of through openings, wherein the receiving limbs together have a cross-section partially enclosing an internal space,
a plurality of rolling bodies received in the through openings in the receiving limbs,
wherein the rolling body cage is arranged with the rolling bodies between the first rail element and the further rail element,
wherein the telescopic rail has a first group of rolling bodies and the rolling bodies of the first group are made of graphite,
wherein the telescopic rail has a second group of rolling bodies and the rolling bodies of the second group are made of a material which is of greater hardness than the graphite of the rolling bodies of the first group,
wherein at least two rolling bodies of the second group are respectively received in the through openings of at least two receiving limbs,
wherein the rolling bodies of the first group and the rolling bodies of the second group in at least one section plane are of a circular cross-section of a diameter, and wherein in the through openings of each of at least two receiving limbs all rolling bodies of the first group are of a smaller diameter than at least two rolling bodies of the second group.

2. A telescopic rail according to claim 1 characterised in that the graphite of the first group of rolling bodies is of a hardness of 50 Shore or more, or 60 Shore or more.

3. A telescopic rail according to claim 1 characterised in that the graphite of the first group of rolling bodies has a compression strength of 90 MPa or more, or 100 MPa or more.

4. A telescopic rail according to claim 1 characterised in that the rolling bodies of the first group are arranged in other through openings of the receiving limbs from the rolling bodies of the second group.

5. A telescopic rail according to claim 1 characterised in that each rolling body of the first group is respectively separated from the rolling bodies of the second group by a portion of a receiving limb of the rolling body cage.

6. A telescopic rail according to claim 1 characterised in that arranged in each of the receiving limbs alternately in the longitudinal direction are rolling bodies of the first group and rolling bodies of the second group.

7. A telescopic rail according to claim 1 characterised in that considered in the longitudinal direction in each receiving limb the first and the last rolling bodies are respectively rolling bodies of the second group.

8. A telescopic rail according to claim 1 characterised in that the number of rolling bodies of the second group in at least two receiving limbs is at least twice as great as the number of rolling bodies of the first group.

9. A telescopic rail according to claim 1 characterised in that the rolling bodies at least of the first group or the second group are balls.

10. A telescopic rail according to claim 1 characterised in that all through openings in the receiving limbs are of the same geometrical shape.

11. A telescopic rail according to claim 1 characterised in that at least one of the through openings of each receiving limb in at least one section plane perpendicular to the receiving limbs is of a cross-section narrowing in the direction of the internal space.

12. A telescopic rail according to claim 1 in that the through openings in at least one section plane that is perpendicular to the receiving limbs have straight mutually oppositely disposed side surfaces, wherein each of the receiving limbs has portions which are angled with respect to each other about an axis perpendicular to the section plane, wherein the axis intersects the through openings so that the side surfaces are at a spacing from each other, that decreases in the direction of the internal space.

13. A domestic appliance for foodstuff preparation comprising a telescopic rail according to claim 1.

14. A dishwasher or climatic chamber comprising a telescopic rail according to claim 1.

* * * * *